No. 808,444. PATENTED DEC. 26, 1905.
P. GERGERSEN & T. D. PARR.
HOSE CLAMP.
APPLICATION FILED APR. 8, 1905.

2 SHEETS—SHEET 1.

Witnesses
J. C. Simpson.
E. M. Colford.

Inventors
P. Gergersen.
T. D. Parr.

By
Attorneys.

No. 808,444. PATENTED DEC. 26, 1905.
P. GERGERSEN & T. D. PARR.
HOSE CLAMP.
APPLICATION FILED APR. 8, 1905.

2 SHEETS—SHEET 2.

Witnesses
J. C. Simpson
E. M. Colford

Inventors
P. Gergersen,
T. D. Parr
By Chandler & Chandler
Attorneys

UNITED STATES PATENT OFFICE.

PETER GERGERSEN AND THOMAS D. PARR, OF SEATTLE, WASHINGTON.

HOSE-CLAMP.

No. 808,444.          Specification of Letters Patent.          Patented Dec. 26, 1905.

Application filed April 8, 1905. Serial No. 254,574.

*To all whom it may concern:*

Be it known that we, PETER GERGERSEN and THOMAS D. PARR, citizens of the United States, residing at Seattle, in the county of King, State of Washington, have invented certain new and useful Improvements in Hose-Clamps; and we do hereby declare the following to be a full, clear, and exact description of the invention, such as will enable others skilled in the art to which it appertains to make and use the same.

This invention relates to hose-couplings, and more particularly to the means for fastening the coupling devices to the hose-section, and has for its object to provide means for tightly clamping a rubber or fabric hose-section upon the sleeve of a coupling device.

Another object is to provide a clamping means which will be extremely simple and which may be manufactured at a low figure.

Other objects and advantages will be apparent from the following description, and it will be understood that modifications of the specific construction shown may be made and any suitable materials may be used without departing from the spirit of the invention.

Figure 1:
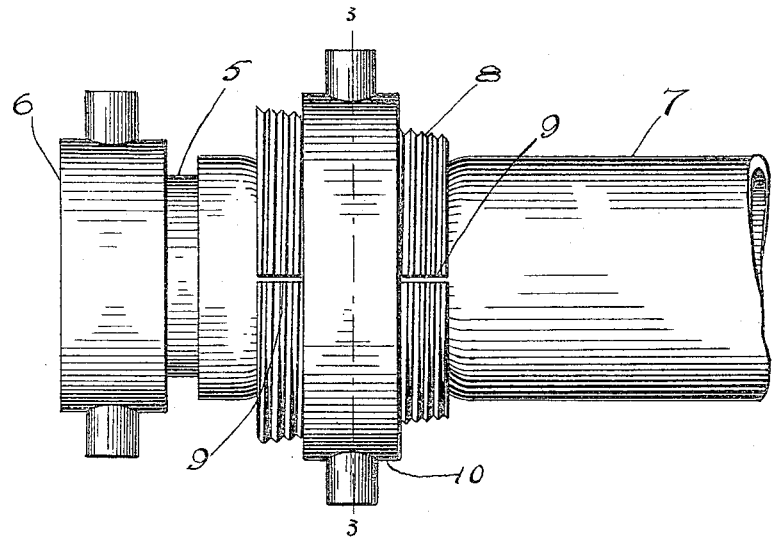
Figure 2:
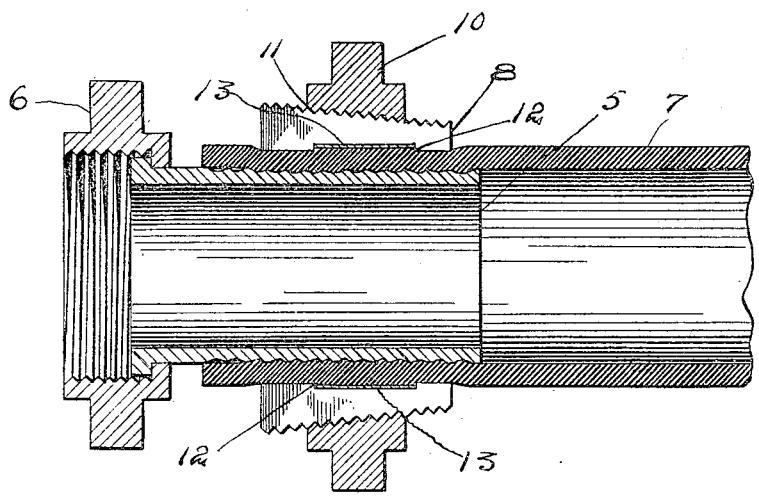
Figure 3:
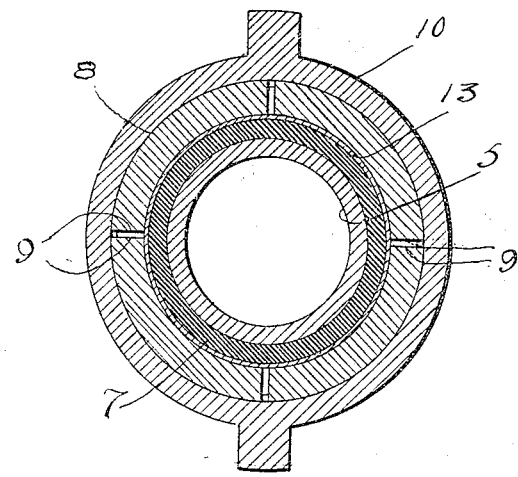
Figure 4:
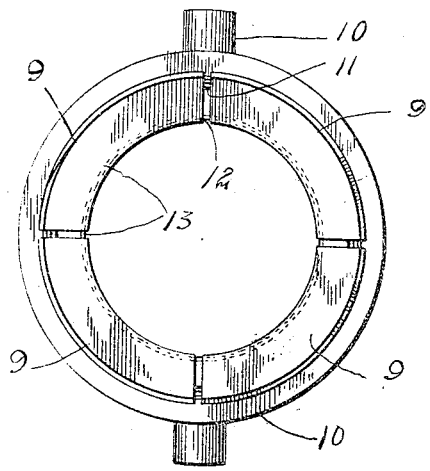

In the drawings forming a portion of this specification, and in which like numerals of reference indicate similar parts in the several views, Figure 1 is a side elevation of the present invention, showing one member of a coupling only. Fig. 2 is a longitudinal section. Fig. 3 is a section on line 3 3 of Fig. 1. Fig. 4 is a view of the clamp removed, illustrating the manner in which the segments of the clamping-collar are held within the nut.

Referring now to the drawings, there is shown one member of a coupler comprising the usual sleeve 5 and a revoluble coupling member 6 engaged therewith. One end of a hose-section 7 is engaged over the sleeve 5 and the present clamp is engaged with the hose-section. This clamp comprises a tapered clamping-collar 8, which is composed of a plurality of segmental sections 9, and, as shown, the taper of the collar is upon its outer face only. The outer face of the collar is threaded, and engaged therewith there is a nut 10, having a tapered opening 11 therein provided with threads which are meshed with those of the collar, and it will thus be apparent that when the collars are revolved in one direction the segments 9 will be moved toward each other to reduce the size of the opening through the collar, thus clamping the sleeve 5 tightly within the hose-section 7. As shown in the drawings, the segments 9 lie normally in spaced relation at their ends to permit of the movement of the segments toward each other, as described in the foregoing. Each of the segments 9 has a longitudinal recess in its inner face opening through its ends, these recesses being indicated at 12 and the recesses of the several segments register with each other to form a continuous annular groove in which there is disposed a split ring 13, of spring metal which holds the segments yieldably with their ends in spaced relation, and, as will be readily understood, this spring acts to hold the segments with their threads snugly engaging those of the nut 10 to prevent movement of the segments independently of the nut, thus making it possible to place the clamp bodily in position upon a hose-section or to remove it therefrom.

What is claimed is—

1. A hose-clamp comprising a collar having a tapered outer face provided with threads, said collar comprising a plurality of segments, a nut having a tapered threaded passage in which the segments are engaged in spaced relation to each other, and a spring engaged within the segments and arranged to hold them within the nut and yieldably in spaced relation.

2. A hose-clamp comprising a collar having a tapered outer face, said collar comprising a plurality of segmental sections, said sections having registering recesses in their inner faces to form an annular groove, a nut having a threaded passage in which the collar is engaged, said passage being tapered to correspond with the taper of the collar, said segments lying in spaced relation at their ends, and a spring-ring engaged in the annular groove and arranged to hold the segments yieldably in spaced relation and in engagement with the nut.

In testimony whereof we affix our signatures in presence of two witnesses.

PETER GERGERSEN.
                THOMAS D. PARR.

Witnesses:
   A. J. TENNANT.
   J. T. RONALD.